US012596174B2

(12) United States Patent
Goto et al.

(10) Patent No.: US 12,596,174 B2
(45) Date of Patent: Apr. 7, 2026

(54) DISTANCE MEASUREMENT DEVICE, DISTANCE MEASUREMENT METHOD, AND RADAR DEVICE

(71) Applicant: Mitsubishi Electric Corporation, Tokyo (JP)

(72) Inventors: Hiroki Goto, Tokyo (JP); Masashi Mitsumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 470 days.

(21) Appl. No.: 18/083,934

(22) Filed: Dec. 19, 2022

(65) Prior Publication Data

US 2023/0124983 A1     Apr. 20, 2023

Related U.S. Application Data

(63) Continuation of application No. PCT/JP2020/029917, filed on Aug. 5, 2020.

(51) Int. Cl.
    *G01S 7/35*      (2006.01)
    *G01S 13/34*     (2006.01)
                     (Continued)

(52) U.S. Cl.
    CPC .............. *G01S 7/356* (2021.05); *G01S 13/34* (2013.01)

(58) Field of Classification Search
    CPC ........ G01S 7/356; G01S 13/34; G01S 7/4917; G01S 17/34; G01S 17/32; G01S 7/4911;
                     (Continued)

(56) References Cited

U.S. PATENT DOCUMENTS

| | | | |
|---|---|---|---|
| 10,838,061 B1* | 11/2020 | Crouch | .................. G01S 17/36 |
| 2012/0106618 A1* | 5/2012 | Kudo | .................... H04L 27/266 |
| | | | 375/232 |

(Continued)

FOREIGN PATENT DOCUMENTS

| | | |
|---|---|---|
| DE | 10 2018 216 636 A1 | 4/2020 |
| EP | 3 637 134 A1 | 4/2020 |

(Continued)

OTHER PUBLICATIONS

German Office Action for German Application No. 112020007239.8, dated Sep. 7, 2023, with English translation.

*Primary Examiner* — Ladimir Magloire
*Assistant Examiner* — Remash R Guyah
(74) *Attorney, Agent, or Firm* — Birch, Stewart, Kolasch & Birch, LLP

(57)          ABSTRACT

A distance measurement device includes: a signal division unit to divide a digital signal into N digital signals (N is an integer equal to or greater than 2), the digital signal showing interference light between reflected light which is received from a distance measurement target, and reference light; a frequency shift unit to shift a frequency of each of the N digital signals after distribution; a Fourier transform unit to perform a Fourier transform on each of the N digital signals after frequency shift; and a distance calculation unit to determine a frequency component related to the distance measurement target, to determine a shift amount related to a signal after the Fourier transform which includes the determined frequency component, and to calculate the distance from the distance measurement device to the distance measurement target from the sum of the frequency of the determined frequency component and the determined shift amount.

11 Claims, 7 Drawing Sheets

(51) Int. Cl.
*G01P 3/36* (2006.01)
*G01S 17/26* (2020.01)
*G01S 17/36* (2006.01)

(58) Field of Classification Search
CPC ...... G01S 7/4913; G01S 7/4808; G01S 17/58;
G01S 11/10; G01S 7/4865; G01P 3/36;
G01P 3/366; G01P 3/68; H01S 3/1124;
H01S 3/115; H04L 27/2672; H04L
25/03159; H04L 27/26522; H04L 27/266;
H04L 2025/03414; G01C 3/06; G01B
9/02; H04B 10/60
USPC ................ 342/128; 356/28, 4.01–5.15, 28.5,
356/450–520; 375/350
See application file for complete search history.

(56) References Cited

U.S. PATENT DOCUMENTS

| | | | | |
|---|---|---|---|---|
| 2017/0003312 A1* | 1/2017 | Uozumi | .................... | G01P 3/36 |
| 2021/0293960 A1* | 9/2021 | Kreitinger | ............. | G01S 7/4815 |
| 2022/0164924 A1* | 5/2022 | Millar | .................... | G01S 17/26 |

FOREIGN PATENT DOCUMENTS

| | | | | |
|---|---|---|---|---|
| JP | 2000-214250 A | 8/2000 | | |
| JP | 2003-43139 A | 2/2003 | | |
| WO | WO-2018230474 A1 * | 12/2018 | ............. | G01S 17/32 |

* cited by examiner

DISTANCE MEASUREMENT DEVICE, DISTANCE MEASUREMENT METHOD, AND RADAR DEVICE

CROSS REFERENCE TO RELATED APPLICATIONS

This application is a Continuation of PCT International Application No. PCT/JP2020/029917, filed on Aug. 5, 2020, all of which is hereby expressly incorporated by reference into the present application.

TECHNICAL FIELD

The present disclosure relates to a distance measurement device for and a distance measurement method of calculating the distance from the distance measurement device to a distance measurement target, and a radar device including the distance measurement device.

BACKGROUND ART

Among distance measurement devices, there is a distance measurement device (referred to as "conventional distance measurement device" hereinafter) which includes an FFT converter to perform a fast Fourier transform (FFT) on a digital signal showing interference light between reflected light which is received from a distance measurement target by applying part of frequency swept light to the distance measurement target and reference light which is the remaining part of the frequency swept light, and which calculates the distance from the distance measurement device to the distance measurement target on the basis of a signal after the FFT by the FFT converter.

Incidentally, there is a millimeter wave radar device which includes a zoom FFT converter to perform a zoom FFT on a digital signal (for example, refer to Patent Literature 1). The zoom FFT converter thins out part of the digital signal, and performs an FFT on the digital signal after the thinning out.

CITATION LIST

Patent Literature

Patent Literature 1: JP 2003-43139 A

SUMMARY OF INVENTION

Technical Problem

In the conventional distance measurement device, an increase in the number of sampling points of the FFT in the FFT converter makes it possible to improve the accuracy of the calculation of distance as the frequency resolution is improved. However, it is difficult to increase the number of sampling points of the FFT without limitation. Therefore, the conventional distance measurement device has a problem that, since it does not acquire a desired frequency resolution, it cannot provide desired accuracy of the calculation of distance.

There is a case in which the application of the zoom FFT converter disclosed in Patent Literature 1 to a conventional distance measurement device increases the frequency resolution even in the case where the number of sampling points is the same as those in the conventional distance measurement device. However, since the zoom FFT converter thins out part of the digital signal, it sometimes leads to a situation where a spurious signal is generated or where a desired signal is buried in noise. Under such a situation where a spurious signal is generated or a desired signal is buried in noise, there is a case in which the distance cannot be calculated even though the frequency resolution is improved, and the above-mentioned problem cannot be solved.

The present disclosure is made in order to solve the above-mentioned problem, and it is therefore an object of the present disclosure to provide a distance measurement device and a distance measurement method capable of improving the accuracy of the calculation of distance compared to the conventional distance measurement device even though the number of sampling points is the same as those in the conventional distance measurement device.

Solution to Problem

A distance measurement device according to present disclosure includes; processing circuitry to divide a digital signal into N digital signals (N is an integer equal to or greater than 2), the digital signal showing interference light between reflected light which is received from a distance measurement target by applying part of frequency swept light whose frequency varies with time to the distance measurement target, and to reference light which is the remaining part of the frequency swept light; to shift a frequency of each of the N digital signals after distribution by shift amounts that are different from each other; to perform a Fourier transform on each of the N digital signals after frequency shift; and to determine a frequency component related to the distance measurement target, out of a plurality of frequency components contained in all of N signals after the Fourier transform, to determine a shift amount related to a signal after the Fourier transform which includes the determined frequency component, out of a plurality of shift amounts which are used for the shift of the frequency, and to calculate the distance from the distance measurement device to the distance measurement target from the sum of the frequency of the determined frequency component and the determined shift amount.

Advantageous Effects of Invention

According to the present disclosure, the accuracy of the calculation of distance can be improved compared to the conventional distance measurement device even though the number of sampling points is the same as those in the conventional distance measurement device.

BRIEF DESCRIPTION OF DRAWINGS

FIG. 5 is a hardware block diagram of a computer in a case where the distance measurement device 2 is implemented by software, firmware, or the like;

DESCRIPTION OF EMBODIMENTS

Hereinafter, in order to explain the present disclosure in greater detail, embodiments of the present disclosure will be described with reference to the accompanying drawings.

Embodiment 1

Figure 1:
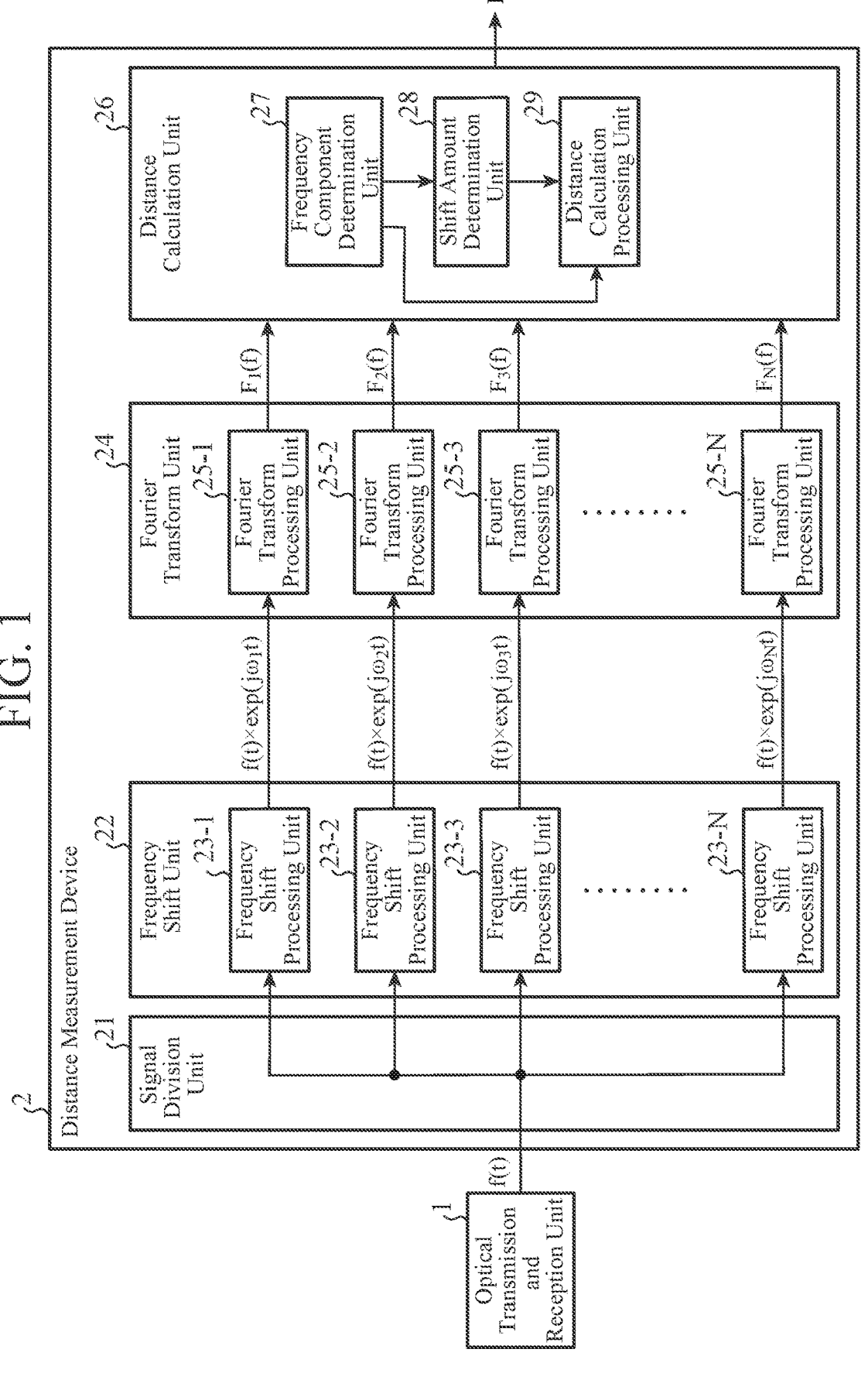
FIG. 1 is a schematic diagram showing a radar device including a distance measurement device 2 according to Embodiment 1.

FIG. 1 is a schematic diagram showing a radar device including a distance measurement device 2 according to Embodiment 1.

The radar device shown in FIG. 1 includes an optical transmission and reception unit 1 and the distance measurement device 2.

The optical transmission and reception unit 1 applies part of frequency swept light whose frequency varies with time to a distance measurement target, and, after that, receives reflected light which is the frequency swept light reflected by the distance measurement target.

The optical transmission and reception unit 1 outputs a digital signal f(t) showing interference light between the reflected light and reference light which is the remaining part of the frequency swept light to the distance measurement device 2. "t" is a time.

Figure 2:
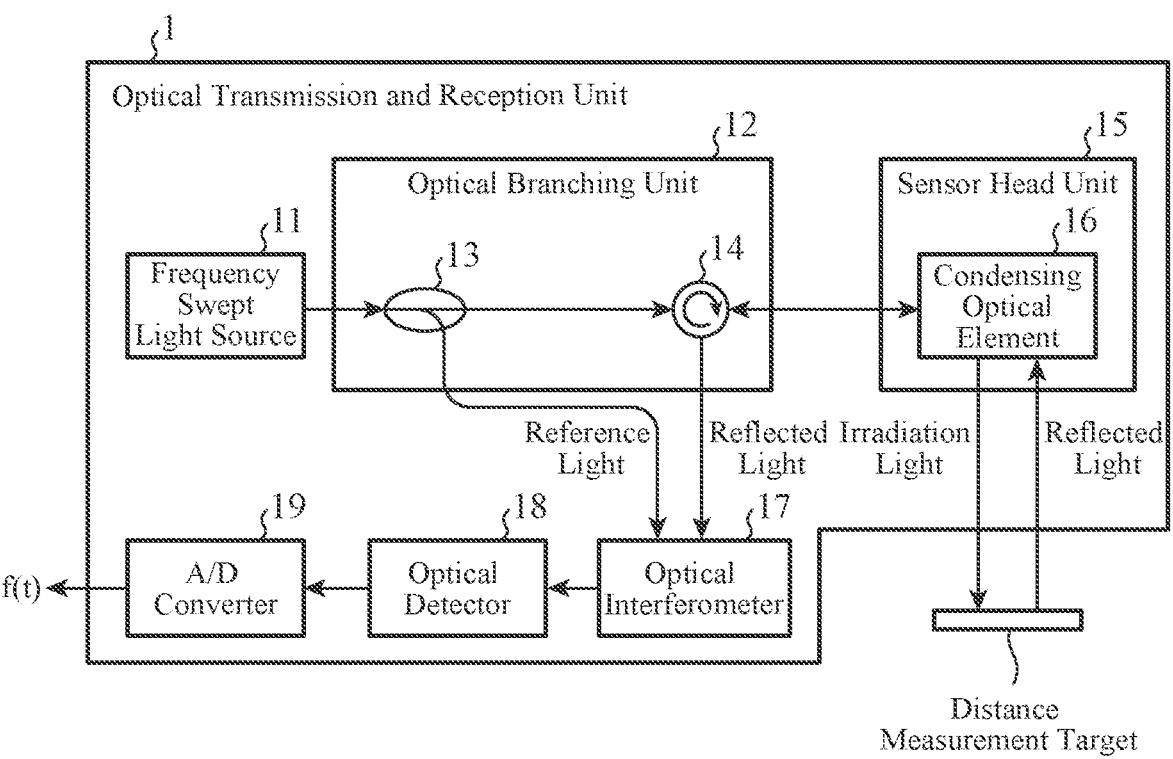
FIG. 2 is a schematic diagram showing the inside of an optical transmission and reception unit 1.

FIG. 2 is a schematic diagram showing the inside of the optical transmission to and reception unit 1.

The optical transmission and reception unit 1 includes a frequency swept light source 11, an optical branching unit 12, a sensor head unit 15, an optical interferometer 17, an optical detector 18 and an analog to digital converter (referred to as an "A/D converter" hereinafter) 19.

The frequency swept light source 11 outputs the frequency swept light whose frequency varies with time to the optical branching unit 12.

Figure 3:
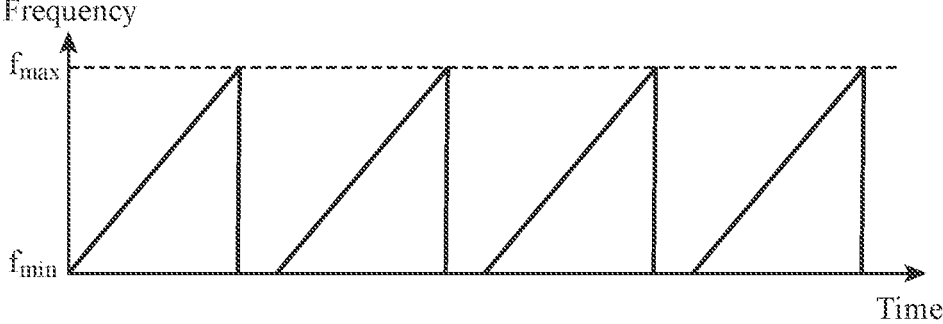
FIG. 3 is an explanatory drawing showing an example of frequency swept light.

FIG. 3 is an explanatory drawing showing an example of the frequency swept light.

The frequency of the frequency swept light varies from a minimum frequency $f_{min}$ to a maximum frequency $f_{max}$ with time. When the frequency of the frequency swept light reaches the maximum frequency $f_{max}$, the frequency of the frequency swept light temporarily returns to the minimum frequency $f_{min}$, and, after that, varies from the minimum frequency $f_{min}$ to the maximum frequency $f_{max}$ again.

The optical branching unit 12 includes an optical coupler 13 and a circulator 14.

The optical coupler 13 divides the frequency swept light outputted from the frequency swept light source 11 into irradiation light and the reference light.

The optical coupler 13 outputs the irradiation light to the circulator 14, and outputs the reference light to the optical interferometer 17.

The circulator 14 outputs the irradiation light outputted from the optical coupler 13 to a condensing optical element 16 of the sensor head unit 15.

The circulator 14 outputs reflected light outputted from the condensing optical element 16 to the optical interferometer 17.

The sensor head unit 15 includes the condensing optical element 16.

The condensing optical element 16 is implemented by, for example, two aspheric lenses.

The condensing optical element 16 condenses the irradiation light outputted from the circulator 14 to the distance measurement target.

More specifically, a previous-stage aspheric lens, out of the two aspheric lenses which the condensing optical element 16 includes, converts the irradiation light outputted from the circulator 14 into collimated light.

By condensing the collimated light after the conversion by the previous-stage aspheric lens, a next-stage aspheric lens applies the light to the distance measurement target.

Further, the condensing optical element 16 condenses light reflected from the distance measurement target, and outputs the reflected light to the circulator 14.

The optical interferometer 17 generates interference light between the reflected light outputted from the circulator 14 and the reference light outputted from the optical coupler 13, and outputs the interference light to the optical detector 18.

The optical detector 18 detects the interference light outputted from the optical interferometer 17, and converts the interference light into an electric signal.

The optical detector 18 outputs the electric signal to the A/D converter 19.

The A/D converter 19 converts the analog electric signal outputted from the optical detector 18 from an analog signal into a digital signal f(t), and outputs the digital signal f(t) to the distance measurement device 2.

The distance measurement device 2 shown in FIG. 1 includes a signal division unit 21, a frequency shift unit 22, a Fourier transform unit 24 and a distance calculation unit 26.

Figure 4:
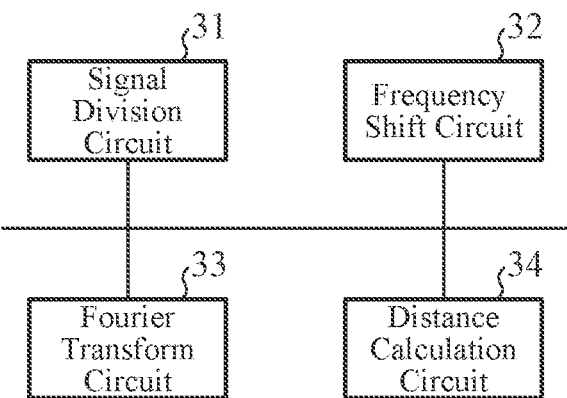
FIG. 4 is a hardware block diagram showing hardware of the distance measurement device 2 according to Embodiment 1.

FIG. 4 is a hardware block diagram showing the hardware of the distance measurement device 2 according to Embodiment 1.

The signal division unit 21 is implemented by, for example, a signal division circuit 31 shown in FIG. 4.

The signal division unit 21 divides the digital signal f(t) outputted from the optical transmission and reception unit 1 into N signals. N is an integer equal to or greater than 2.

The signal division unit 21 outputs the N digital signals f(t) to the frequency shift unit 22.

The frequency shift unit 22 is implemented by, for example, a frequency shift circuit 32 shown in FIG. 4.

The frequency shift unit 22 includes N frequency shift processing units 23-1 to 23-N.

The frequency shift unit 22 shifts the frequency of each of the N digital signals after the distribution by the signal division unit 21 by shift amounts that are different from each other.

The frequency shift unit 22 outputs N digital signals $f(t) \times exp(j\omega_1 t)$ to $f(t) \times exp(j\omega_N t)$ after the frequency shift to the Fourier transform unit 24.

The frequency shift processing unit 23-1 shifts the frequency of the digital signal f(t) outputted from the optical transmission and reception unit 1 by a shift amount $\Delta f_1$, and outputs a digital signal $f(t) \times exp(j\omega_1 t)$ after the frequency shift to a Fourier transform processing unit 25-1 of the Fourier transform unit 24. $\omega_1$ is an angular frequency which is the multiplication of the shift amount $\Delta f_1$ by $2\pi$.

In the distance measurement device 2 shown in FIG. 1, the shift amount $\Delta f_1$ is zero and the frequency shift processing unit 23-1 does not shift the frequency of the digital signal f(t) Therefore, f(t)=f(t)×exp(j$\omega_1$t).

Therefore, the distance measurement device 2 does not need to include the frequency shift processing unit 23-1, and the optical transmission and reception unit 1 and the Fourier transform processing unit 24-1 may be connected directly.

However, the case of the shift amount $\Delta f_1$=0 is an example, and there may be a case of the shift amount $\Delta f_1 \neq 0$. In the case where the shift amount $\Delta f_1 \neq 0$, the distance measurement device 2 needs to include the frequency shift processing unit 23-1.

The frequency shift processing unit 23-2 shifts the frequency of the digital signal f(t) outputted from the optical transmission and reception unit 1 by a shift amount $\Delta f_2$, and outputs a digital signal f(t)×exp(j$\omega_2$t) after the frequency shift to a Fourier transform processing unit 25-2 of the Fourier transform unit 24. $\omega_2$ is an angular frequency which is the multiplication of the shift amount $\Delta f_2$ by $2\pi$.

The frequency shift processing unit 23-3 shifts the frequency of the digital signal f(t) outputted from the optical transmission and reception unit 1 by a shift amount $\Delta f_3$, and outputs a digital signal f(t)×exp(j$\omega_3$t) after the frequency shift to a Fourier transform processing unit 25-3 of the Fourier transform unit 24. $\omega_3$ is an angular frequency which is the multiplication of the shift amount $\Delta f_3$ by $2\pi$.

The frequency shift processing unit 23-N shifts the frequency of the digital signal f(t) outputted from the optical transmission and reception unit 1 by a shift amount $\Delta f_N$, and outputs a digital signal f(t)×exp(j$\omega_N$t) after the frequency shift to a Fourier transform processing unit 25-N of the Fourier transform unit 24. $\omega_N$ is an angular frequency which is the multiplication of the shift amount $\Delta f_N$ by $2\pi$, wherein $\Delta f_1 < \Delta f_2 < \Delta f_3 < \ldots < \Delta f_N$.

The Fourier transform unit 24 is implemented by, for example, a Fourier transform circuit 33 shown in FIG. 4.

The Fourier transform unit 24 includes the N Fourier transform processing units 25-1 to 25-N.

The Fourier transform unit 24 performs a Fourier transform on each of the N digital signals f(t)×exp(j$\omega_n$t) (n=1, . . . , N) after the frequency shift by the frequency shift unit 22.

The Fourier transform unit 24 outputs N signals $F_1$(f) to $F_N$(f) after the Fourier transform to the distance calculation unit 26. f is the frequency.

The Fourier transform processing unit 25-1 performs a Fourier transform on the digital signal f(t)×exp(j$\omega_1$t) after the frequency shift by the frequency shift processing unit 23-1.

The Fourier transform processing unit 25-1 outputs the signal $F_1$(f) after the Fourier transform to the distance calculation unit 26.

The Fourier transform processing unit 25-2 performs a Fourier transform on the digital signal f(t)×exp(j$\omega_2$t) after the frequency shift by the frequency shift processing unit 23-2.

The Fourier transform processing unit 25-2 outputs the signal $F_2$(f) after the Fourier transform to the distance calculation unit 26.

The Fourier transform processing unit 25-3 performs a Fourier transform on the digital signal f(t)×exp(j$\omega_3$t) after the frequency shift by the frequency shift processing unit 23-3.

The Fourier transform processing unit 25-3 outputs the signal $F_3$(f) after the Fourier transform to the distance calculation unit 26.

The Fourier transform processing unit 25-N performs a Fourier transform on the digital signal f(t)×exp(j$\omega_N$t) after the frequency shift by the frequency shift processing unit 23-N.

The Fourier transform processing unit 25-N outputs the signal $F_N$(f) after the Fourier transform to the distance calculation unit 26.

The distance calculation unit 26 is implemented by, for example, a distance calculation circuit 34 shown in FIG. 4.

The distance calculation unit 26 includes a frequency component determination unit 27, a shift amount determination unit 28 and a distance calculation processing unit 29.

The distance calculation unit 26 determines a frequency component FC($f_T$) related to the distance measurement target, out of a plurality of frequency components contained in all of the N signals $F_1$(f) to $F_N$(f) after the Fourier transforms by the Fourier transform unit 24.

The distance calculation unit 26 determines a shift amount $\Delta f_n$ related to the signal $F_n$(f) after the Fourier transform which includes the determined frequency component FC($f_T$), out of the plurality of shift amounts $\Delta f_1$ to $\Delta f_N$ which are used by the frequency shift unit 22 for the shift of the frequency.

The distance calculation unit 26 calculates the distance L from the distance measurement device 2 to the distance measurement target from the sum of the frequency $f_T$ of the determined frequency component FC($f_T$) and the determined shift is amount $\Delta f_n$.

The frequency component determination unit 27 determines the frequency component FC($f_T$) related to the distance measurement target, out of the plurality of frequency components contained in all of the N signals $F_1$(f) to $F_N$(f) after the Fourier transforms by the Fourier transform processing units 25-1 to 25-N.

The frequency component determination unit 27 outputs the frequency component FC($f_T$) related to the distance measurement target to the shift amount determination unit 28, and outputs the frequency $f_T$ of the determined frequency component FC($f_T$) to the distance calculation processing unit 29.

The shift amount determination unit 28 determines the shift amount $\Delta f_n$ related to the signal $F_n$(f) after the Fourier transform which includes the frequency component FC($f_T$) determined by the frequency component determination unit 27, out of the plurality of shift amounts $\Delta f_1$ to $\Delta f_N$ which are used by the frequency shift processing units 23-1 to 23-N for the shift of the frequency.

The shift amount determination unit 28 outputs the determined shift amount $\Delta f_n$ to the distance calculation processing unit 29.

The distance calculation processing unit 29 calculates the sum of the frequency $f_T$ of the frequency component FC($f_T$) determined by the frequency component determination unit 27, and the shift amount $\Delta f_n$ determined by the shift amount determination unit 28.

The distance calculation processing unit 29 calculates the distance L from the distance measurement device 2 to the distance measurement target from the sum ($f_T$+$\Delta f_n$) of the frequency $f_T$ of the frequency component FC($f_T$) and the shift amount $\Delta f_n$.

In FIG. 1, it is assumed that each of the following units: the signal division unit 21, the frequency shift unit 22, the Fourier transform unit 24 and the distance calculation unit 26, which are the components of the distance measurement device 2, is implemented by hardware for exclusive use as shown in FIG. 4. More specifically, it is assumed that the distance measurement device 2 is implemented by the signal division circuit 31, the frequency shift circuit 32, the Fourier transform circuit 33 and the distance calculation circuit 34.

Each of the following circuits: the signal division circuit 31, the frequency shift circuit 32, the Fourier transform circuit 33 and the distance calculation circuit 34 is, for example, a single circuit, a composite circuit, a programmable processor, a parallel programmable processor, an application specific integrated circuit (ASIC), a field-programmable gate array (FPGA), or a combination of these circuits.

The components of the distance measurement device 2 are not limited to ones each implemented by hardware for exclusive use, and the distance measurement device 2 may be implemented by software, firmware, or a combination of software and firmware.

The software or the firmware is stored as a program in a memory of a computer. The computer refers to hardware that executes a program, and is, for example, a central processing unit (CPU), a central processing device, a processing device, an arithmetic device, a microprocessor, a microcomputer, a processor, or a digital signal processor (DSP).

Figure 5:
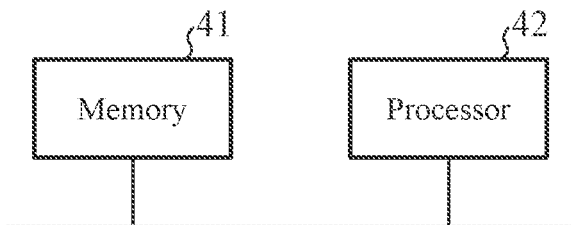

FIG. 5 is a hardware block diagram of a computer in the case where the distance measurement device 2 is implemented by software, firmware, or the like.

In the case where the distance measurement device 2 is implemented by software, firmware, or the like, a program for causing the computer to perform processing procedures performed in the signal division unit 21, the frequency shift unit 22, the Fourier transform unit 24 and the distance calculation unit 26 is stored in a memory 41. A processor 42 of the computer executes the program stored in the memory 41.

Further, in FIG. 4, the example in which each of the components of the distance measurement device 2 is implemented by hardware for exclusive use is shown, and in FIG. 5, the example in which the distance measurement device 2 is implemented by software, firmware, or the like is shown. However, these are only examples, and some components of the distance measurement device 2 may be implemented by hardware for exclusive use, and the remaining components may be implemented by software, firmware, or the like.

Next, the operation of the radar device shown in FIG. 1 will be described.

First, the frequency swept light source 11 of the optical transmission and reception unit 1 outputs the frequency swept light whose frequency varies with time to the optical coupler 13 of the optical branching unit 12, as shown in FIG. 3.

When receiving the frequency swept light from the frequency swept light source 11, the optical coupler 13 divides the frequency swept light into irradiation light and reference light.

The optical coupler 13 outputs the irradiation light to the circulator 14, and outputs the reference light to the optical interferometer 17.

When receiving the irradiation light from the optical coupler 13, the circulator 14 outputs the irradiation light to the condensing optical element 16 of the sensor head unit 15.

When receiving the irradiation light from the circulator 14, the condensing optical element 16 condenses the irradiation light to the distance measurement target.

The condensing optical element 16 also condenses light reflected from the distance measurement target, and outputs the reflected light to the circulator 14.

When receiving the reflected light from the condensing optical element 16, the circulator 14 outputs the reflected light to the optical interferometer 17.

The optical interferometer 17 generates interference light between the reflected light outputted from the circulator 14 and the reference light outputted from the optical coupler 13.

The optical interferometer 17 outputs the interference light to the optical detector 18.

The optical detector 18 detects the interference light outputted from the optical interferometer 17, and converts the interference light into an electric signal.

The optical detector 18 outputs the electric signal to the A/D converter 19.

When receiving the electric signal from the optical detector 18, the A/D converter 19 converts the analog electric signal into a digital signal f(t).

The A/D converter 19 outputs the digital signal f(t) to the distance measurement device 2.

The distance measurement device 2 calculates the distance L from the distance measurement device 2 to the distance measurement target on the basis of the digital signal f(t) outputted from the optical transmission and reception unit 1.

Figure 6:
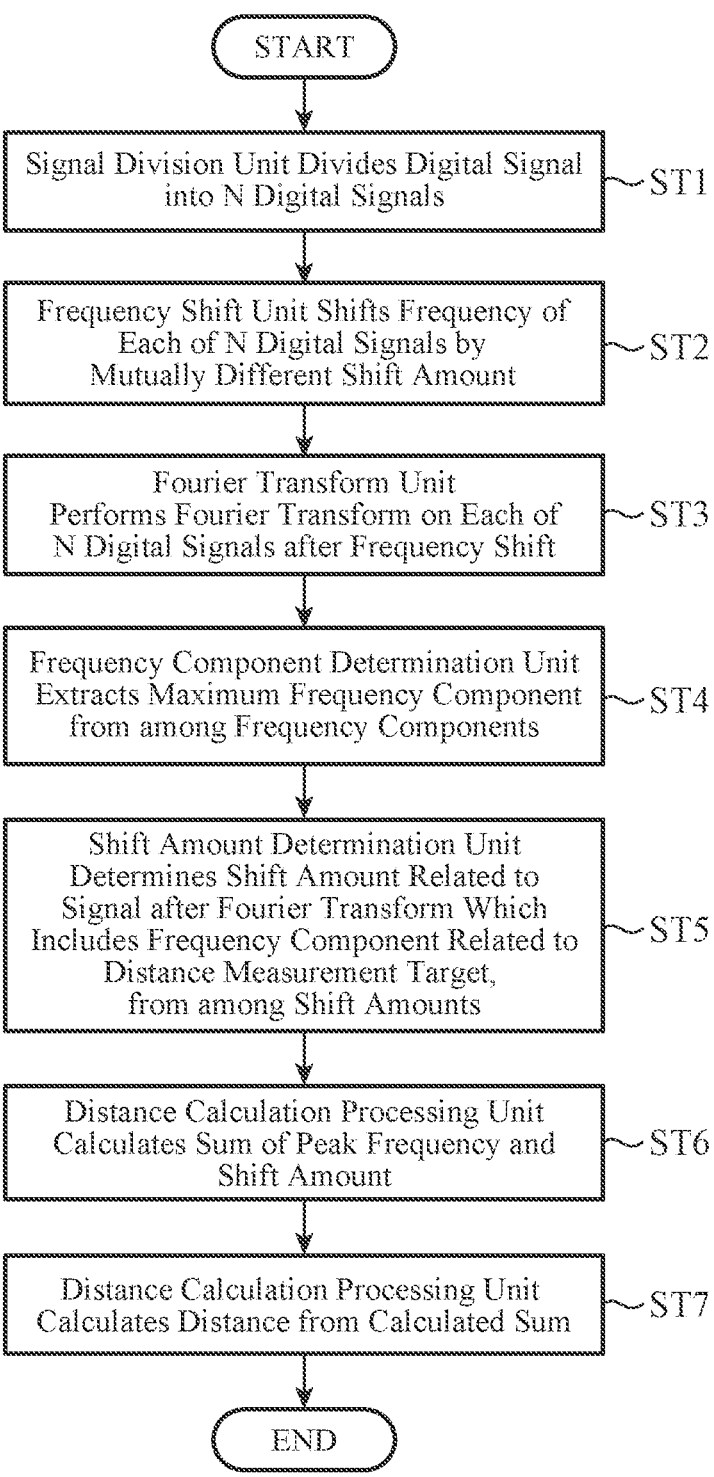
FIG. 6 is a flowchart showing a distance measurement method which is a processing procedure performed by the distance measurement device 2 according to Embodiment 1.

FIG. 6 is a flowchart showing a distance measurement method which is the processing procedure performed by the distance measurement device 2 according to Embodiment 1.

Hereinafter, the operation of the distance measurement device 2 will be described concretely.

When receiving the digital signal f(t) from the optical transmission and reception unit 1, the signal division unit 21 divides the digital signal f(t) into N digital signals (step ST1 of FIG. 6).

The signal division unit 21 outputs the N digital signals f(t) to the frequency shift unit 22.

The frequency shift unit 22 shifts the frequency of each of the N digital signals f(t) after the distribution by the signal division unit 21 by shift amounts that are different from each other (step ST2 of FIG. 6).

More specifically, when receiving the digital signal f(t) from the optical transmission and reception unit 1, the frequency shift processing unit 23-$n$ (n=1, . . . , N) is of the frequency shift unit 22 shifts the frequency of the digital signal f(t) by the shift amount $\Delta f_n$, wherein $\Delta f_1 < \Delta f_2 < \Delta f_3 < \ldots < \Delta f_N$.

The frequency shift processing unit 23-$n$ outputs the digital signal f(t)×exp(j$\omega_n$t) after the frequency shift to the Fourier transform processing unit 25-$n$ of the Fourier transform unit 24.

The plurality of shift amounts $\Delta f_1$ to $\Delta f_N$ may be stored in an internal memory of the frequency shift processing unit 23-$n$, or they may be given from the outside of the distance measurement device 2.

In the distance measurement device 2 shown in FIG. 1, for example, the shift amount $\Delta f_1$ is zero and the frequency shift processing unit 23-1 does not shift the frequency of the digital signal f(t). Therefore, f(t)=f(t)×exp(j$\omega_1$t).

$\Delta f_1$, $\Delta f_2$, $\Delta f_1$, . . . , $\Delta f_N$ are expressed as shown by, for example, the following equations (1).

$$\Delta f_1 = 0 \tag{1}$$

$$\Delta f_2 = \frac{f_{1,max} \times R \times 1}{N}$$

-continued $$\Delta f_3 = \frac{f_{1,max} \times R \times 2}{N}$$

$$\vdots$$

$$\Delta f_N = \frac{f_{1,max} \times R \times (N-1)}{N}$$

In the equations (1), R is the frequency resolution of the signal $F_n(f)$ after the Fourier transform by the Fourier transform processing unit 25-$n$.

$f_{1,max}$ is the frequency of the maximum frequency component $FC_{1,max}$ out of the plurality of frequency components $FC_1$ contained in the signal $F_1(f)$ after the Fourier transform by the Fourier transform processing unit 25-1.

The frequency resolution of the shift amounts $\Delta f_1$ to $\Delta f_N$ is set in accordance with the frequency resolution R of the signal $F_n(f)$ after the Fourier transform, as shown in the equations (1). More specifically, the frequency resolution of the shift amounts $\Delta f_1$ to $\Delta f_N$ is set in accordance with the distance measurement resolution of the distance measurement target.

$\omega_n$ is an angular frequency which is the multiplication of the shift amount $\Delta f_n$ by $2\pi$.

It is necessary to make the angular frequency $\omega_n$ smaller than the ratio of the sampling rate of the digital signal fit) and the number of sampling points of the FFT in the Fourier transform processing unit 25-$n$.

For example, in the case where the sampling rate is 1 [GSa/s], the number of sampling points of the FFT is 4,096, and N=64, the Fourier transform processing unit 25-$n$ can calculate a peak frequency, which will be mentioned later, with the frequency resolution R of 244.1 [kHz]. Note that 244.1 [kHz]=1 [GSa/s]/4,096. Therefore, when the angular frequency is $\omega_n$=(244.1/64)×$2\pi$=3.8 [kHz]$2\pi$, the Fourier transform processing unit 25-$n$ can calculate the peak frequency with the same frequency resolution as that in a Fourier transform processing unit whose number of sampling points of the FFT is 262,144.

When the number of sampling points of the FFT is 262,144, the frequency resolution R is 3.8 [kHz]=1 [GSa's]/262,144.

In contrast, when the number of sampling points of the FFT is 4,096, the frequency resolution R is 244.1 [kHz]=1 [GSa/s]/4,096.

For example, when the number of sampling points of the FFT is 4,096, the frequency shift unit 22 shifts the frequencies of the plurality of digital signals, respectively, by the plurality of frequency shift amounts which are mutually different by 3.8 [kHz]. When the Fourier transform unit 24 which will be mentioned later then performs an FFT on each of the digital signals after the frequency shift, the amplitude values of frequency components are acquired with the frequency resolution R of 244.1 [kHz]. There is a tendency that the closer the relationship between a frequency is component and the distance from the distance measurement device 2 to the distance measurement target is, the larger amplitude value the frequency component has.

Therefore, when the distance calculation unit 26 which will be mentioned later acquires the frequency shift amount and the peak frequency when the amplitude value of the frequency component is the largest, out of all the FFT results, the distance from the distance measurement device 2 to the distance measurement target can be acquired with the same frequency resolution R as that when the number of sampling points of the FFT is 262,144.

The Fourier transform unit 24 performs a Fourier transform on each of the N digital signals $f(t)\times exp(j\omega_1 t)$ to $f(t)\times exp(j\omega_N t)$ after the frequency shift by the frequency shift unit 22 (step ST3 of FIG. 6).

More specifically, the Fourier transform processing unit 25-$n$ (n=1 . . . , N) of the Fourier transform unit 24 performs a Fourier transform on the digital signal $f(t)\times exp(j\omega_n t)$ after the frequency shift by the frequency shift processing unit 23-1.

The Fourier transform processing unit 25-$n$ outputs a signal $F_n(f)$ after the Fourier transform to the distance calculation unit 26.

The frequency component determination unit 27 of the distance calculation unit 26 acquires the signals $F_1(f)$ to $F_N(f)$ after the Fourier transforms from the Fourier transform processing units 25-1 to 25-N.

The frequency component determination unit 27 compares the plurality of frequency components contained in all of the signals $F_1(f)$ to $F_N(f)$ after the Fourier transforms by the Fourier transform processing units 25-1 to 25-N with one another, thereby extracting the maximum frequency component $FC_{n,max}$ out of the plurality of frequency components (step ST4 of FIG. 6).

Figure 7:
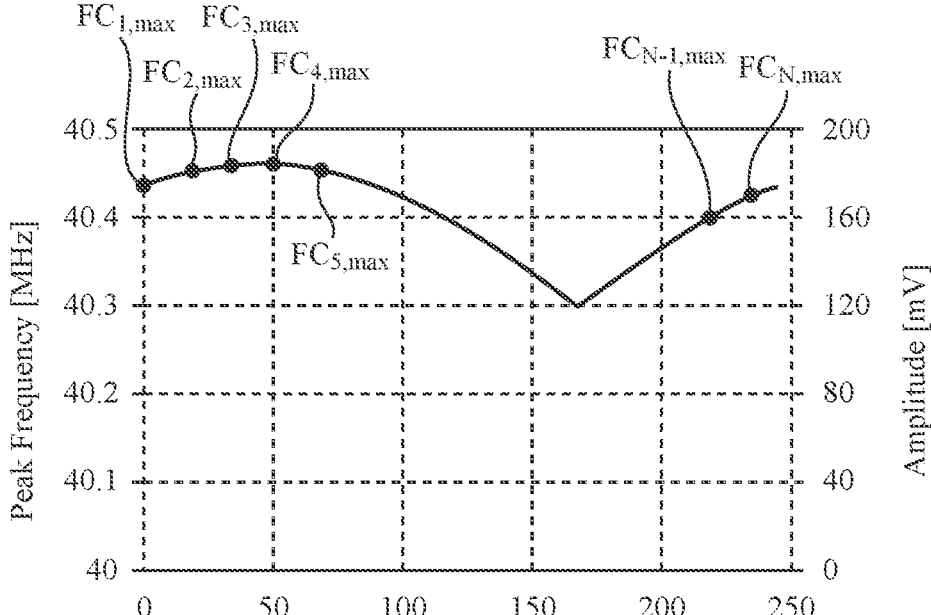
FIG. 7 is an explanatory drawing showing the maximum frequency component $FC_{n,max}$ out of a plurality of frequency components $FC_n$ contained in a signal $F_n(f)$ after a Fourier transform by a Fourier transform processing unit 25-$n$ (n=1, . . . , N)

FIG. 7 is an explanatory drawing showing the maximum frequency component $FC_{n,max}$ out of the plurality of frequency components $FC_n$ contained in the signal $F_n(f)$ after the Fourier transform by the Fourier transform processing unit 25-$n$ (n=1, . . . , N).

$FC_{1,max}$ is the maximum frequency component out of the plurality of frequency components $FC_1$ contained in the signal $F_1(f)$ after the Fourier transform.

$FC_{2,max}$ is the maximum frequency component out of the plurality of frequency components $FC_2$ contained in the signal $F_2(f)$ after the Fourier transform.

$FC_{n,max}$ is the maximum frequency component out of the plurality of frequency components $FC_N$ contained in the signal $F_N(f)$ after the Fourier transform.

In FIG. 7, an example in which the maximum frequency component $FC_{n,max}$ of the signal $F_n(f)$ related to the shift amount $\Delta f_n$ being 50 [kHz] is the largest out of the maximum frequency components $FC_{4,max}$ to $FC_{n,max}$ is shown. More specifically, an example in which the maximum frequency component $FC_{4,max}$ of the signal $F_4(f)$ after the Fourier transform is the largest out of the maximum frequency components $FC_{1,max}$ to $FC_{n,max}$ is shown.

In the example of FIG. 7, the peak frequency $f_T$ which is the frequency of the maximum frequency component $FC_{4,max}$ of the signal $F_4(f)$ related to the shift amount $\Delta f_4$ being 50 [kHz] is approximately 40.45 [MHz].

The frequency component determination unit 27 outputs the extracted maximum frequency component $FC_{n,max}$, as the frequency component $FC(f_T)$ related to the distance measurement target, to the shift amount determination unit 28.

Further, the frequency component determination unit 27 outputs the peak frequency $f_T$ which is the frequency of the maximum frequency component $FC_{n,max}$ to the distance calculation processing unit 29.

In the radar device shown in FIG. 1, the frequency component determination unit 27 extracts the maximum frequency component $FC_{n,max}$ as the frequency component $FC(f_T)$ related to the distance measurement target out of the plurality of frequency components. However, the frequency component $FC(f_T)$ related to the distance measurement target is not limited to the maximum frequency component $FC_{n,max}$, and the frequency component determination unit 27 may extract the second-largest frequency component, as the frequency component $FC(f_T)$ related to the distance measurement target, out of the plurality of frequency components, for example, if no problem occurs in practical use.

The shift amount determination unit 28 acquires the frequency component $FC(f_T)$ related to the distance measurement target from the frequency component determination unit 27.

The shift amount determination unit 28 determines the shift amount $\Delta f_n$ related to the signal $F_n(f)$ after the Fourier transform which includes the frequency component $FC(f_T)$, out of the plurality of shift amounts $\Delta f_1$ to MN which are used by the frequency shift processing units 23-1 to 23-N for the shift of the frequency (step ST5 of FIG. 6).

The plurality of shift amounts $\Delta f_1$ to $\Delta f_N$ may be stored in an internal memory of the shift amount determination unit 28, or may be given from the outside of the distance measurement device 2.

The shift amount determination unit 28 outputs the determined shift amount $\Delta f_n$ to the distance calculation processing unit 29.

The distance calculation processing unit 29 acquires the peak frequency $f_T$ which is the frequency of the maximum frequency component $FC_{n,max}$ from the frequency component determination unit 27, and acquires the shift amount $\Delta f_n$ from the shift amount determination unit 28.

The distance calculation processing unit 29 calculates the sum $\Sigma f$ of the peak frequency $f_T$ and the shift amount $\Delta f_n$, as shown in the following equation (2) (step ST6 of FIG. 6).

$$\Sigma f = f_T + \Delta f_n \qquad (2)$$

The distance calculation processing unit 29 calculates the distance L from the distance measurement device 2 to the distance measurement target from the sum $\Sigma f$ of the peak frequency $f_T$ and the shift amount $\Delta f_n$, as shown in the following equation (3) (step ST7 of FIG. 6).

$$L = \Sigma f \times k \qquad (3)$$

In the equation (3), k is a coefficient related to a light sensing condition in the optical transmission and reception unit 1. The coefficient k may be stored in an internal memory of the distance calculation processing unit 29, or may be given from the outside of the distance measurement device 2.

The distance calculation processing unit 29 outputs the calculated distance L to the outside.

In above-mentioned Embodiment 1, the distance measurement device 2 is configured to include: the signal division unit 21 to divide a digital signal into N digital signals (N is an integer equal to or greater than 2), the digital signal showing interference light between reflected light which is received from a distance measurement target by applying part of frequency swept light whose frequency varies with time to the distance measurement target, and reference light which is the remaining part of the frequency swept light; the frequency shift unit 22 to shift a frequency of each of the N digital signals after distribution by the signal division unit 21 by shift amounts that are different from each other; the Fourier transform unit 24 to perform a Fourier transform on each of the N digital signals after frequency shift by the frequency shift unit 22; and the distance calculation unit 26 to determine a frequency component related to the distance measurement target, out of a plurality of frequency components contained in all of N signals after the Fourier transform by the Fourier transform unit 24, to determine a shift amount related to a signal after the Fourier transform which includes the determined frequency component, out of a plurality of shift amounts which are used by the frequency shift unit 22 for the shift of the frequency, and to calculate the distance from the distance measurement device 2 to the distance measurement target from the sum of the frequency of the determined frequency component and the determined shift amount. Therefore, the distance measurement device 2 can improve the accuracy of the calculation of the distance compared to the conventional distance measurement device even in the case where the number of sampling points is the same as that in the conventional distance measurement device.

Embodiment 2

In the Embodiment 2, a distance measurement device 2 which includes a calculator 51 instead of the signal division unit 21, the frequency shift unit 22 and the Fourier transform unit 24 will be described.

Figure 8:
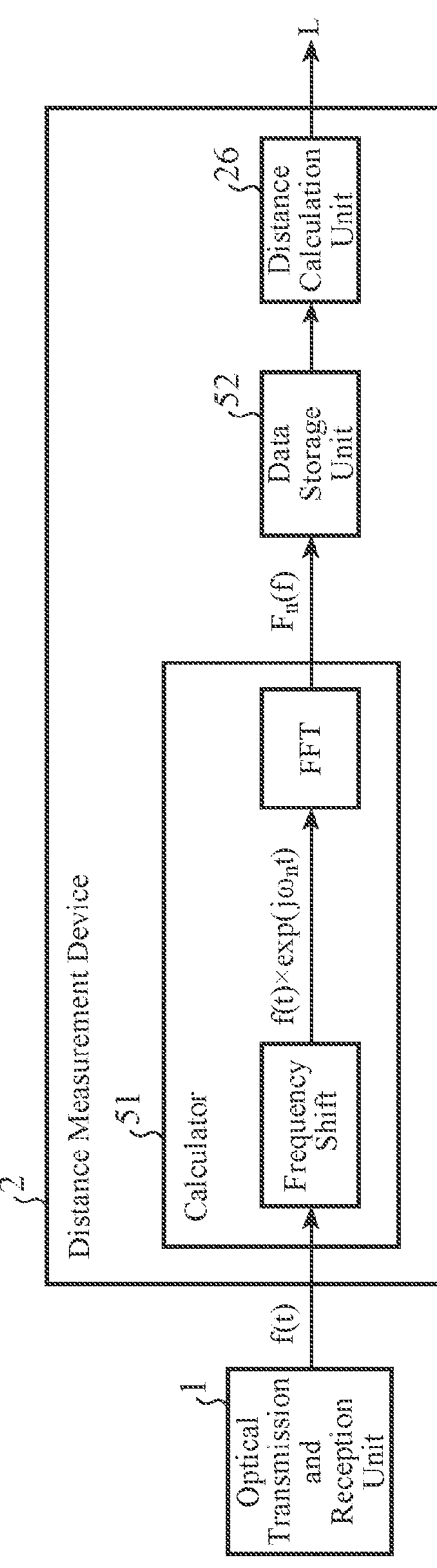
FIG. 8 is a schematic diagram showing a radar device including a distance measurement device 2 according to Embodiment 2.

FIG. 8 is a schematic diagram showing a radar device including the distance measurement device 2 according to the Embodiment 2.

The radar device shown in FIG. 8 includes an optical transmission and reception unit 1 and the distance measurement device 2.

The distance measurement device 2 includes the calculator 51, a data storage unit 52 and a distance calculation unit 26.

Figure 9:
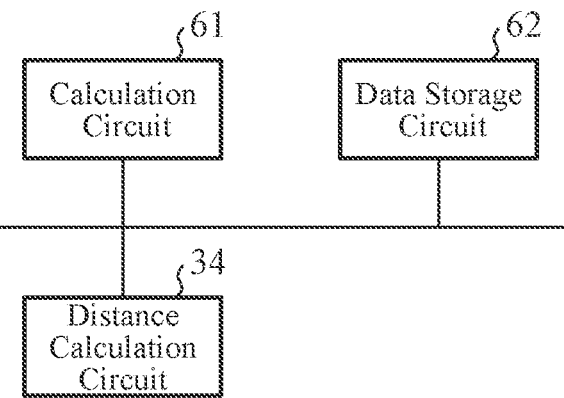
FIG. 9 is a hardware block diagram showing hardware of the distance measurement device 2 according to Embodiment 2.

FIG. 9 is a hardware block diagram showing the hardware of the distance measurement device 2 according to the Embodiment 2.

The calculator 51 is implemented by, for example, a calculation circuit 61 shown in FIG. 9.

The calculator 51 acquires a digital signal f(t) showing interference light from the optical transmission and reception unit 1.

The calculator 51 shifts N times the frequency of the digital signal f(t) by shift amounts $\Delta f_n$ (n=1, ..., N) that are different from each other.

The calculator 51 performs a Fourier transform on each digital signal $f(t) \times exp(j\omega_n t)$ after the frequency shift.

The calculator 51 outputs a signal $F_n(f)$ after the Fourier transform to the data storage unit 52.

The processes of the calculator 51 are shown in the radar device shown in FIG. 8. More specifically, a frequency shifting process of the calculator 51 is denoted as "frequency shift", and a Fourier transform process of the calculator 51 is denoted as "FFT".

The data storage unit 52 is implemented by, for example, a data storage circuit 62 shown in FIG. 9.

The data storage unit 52 stores the signals $F_1(f)$ to $F_N(f)$ after the Fourier transform which are outputted from the calculator 51.

In FIG. 8, it is assumed that each of the following units: the calculator 51, the data storage unit 52 and the distance calculation unit 26, which are the components of the distance measurement device 2, is implemented by hardware for exclusive use as shown in FIG. 9. More specifically, it is assumed that the distance measurement device 2 is implemented by the calculation circuit 61, the data storage circuit 62 and the distance calculation circuit 34.

Here, the data storage circuit 62 is, for example, a non-volatile or volatile semiconductor memory, such as a random access memory (RAM), a read only memory (ROM), a flash memory, an erasable programmable read only memory (EPROM), or an electrically erasable programmable read only memory (EEPROM), a magnetic disc, a flexible disc, an optical disc, a compact disc, a mini disc, or a digital versatile disc (DVD).

Each of the following circuits: the calculation circuit 61 and the distance calculation circuit 34 is, for example, a single circuit, a composite circuit, a programmable processor, a parallel programmable processor, an ASIC, an FPGA or a combination of these circuits.

The components of the distance measurement device 2 are not limited to ones each implemented by hardware for exclusive use, and the distance measurement device 2 may be implemented by software, firmware, or a combination of software and firmware.

In the case where the distance measurement device 2 is implemented by software, firmware, or the like, the data storage unit 52 is configured on a memory 41 shown in FIG. 5. Further, a program for causing a computer to perform processing procedures performed in the calculator 51 and the distance calculation unit 26 is stored in the memory 41. Then, the processor 42 shown in FIG. 5 executes the program stored in the memory 41.

Further, in FIG. 9, the example in which each of the components of the distance measurement device 2 is implemented by hardware for exclusive use is shown, and in FIG. 5, the example in which the distance measurement device 2 is implemented by software, firmware, or the like is shown. However, these are only examples, and each of some components of the distance measurement device 2 may be implemented by hardware for exclusive use, and the remaining components may be implemented by software, firmware, or the like.

Next, the operation of the radar device shown in FIG. 8 will be described.

Since the radar device is the same as the radar device shown in FIG. 1 except for the calculator 51 and the data storage unit 52, only the operations of the calculator 51 and the data storage unit 52 will be described hereinafter.

The calculator 51 acquires the digital signal f(t) showing the interference light from the optical transmission and reception unit 1.

The calculator 51 shifts N times the frequency of the digital signal f(t) by the shift amounts $\Delta f_n$ (n=1, . . . , N) that are different from each other.

More specifically, the calculator 51 shifts the frequency of the digital signal f(t) by the shift amounts $\Delta f_n$ (n=1, . . . , N) that are different from each other by serially performing the frequency shifting process N times.

In the radar device shown in FIG. 1, the N frequency shift processing units 23-1 to 23-N shift the frequency of each of the N digital signals f(t) by the shift amounts $\Delta f_1$ to $\Delta f_N$ that are different from each other by performing the frequency shifting process in parallel.

The digital signals $f(t) \times \exp(j\omega_1 t)$ to $f(t) \times \exp(j\omega_N t)$ after the frequency shift which are acquired by the calculator 51 are the same as the digital signals $f(t) \times \exp(j\omega_1 t)$ to f(t)×exp $(j\omega_N t)$ after the frequency shift which are acquired by the frequency shift processing units 23-1 to 23-N.

The calculator 51 performs a Fourier transform on each of the digital signals $f(t) \times \exp(j\omega_n t)$ after the frequency shift.

More specifically, the calculator 51 performs a Fourier transform on each of the digital signals $f(t) \times \exp(j\omega_n t)$ (n=1, . . . , N) after the frequency shift by serially performing the Fourier transform process N times.

In the radar device shown in FIG. 1, the N Fourier transform processing units 25-1 to 25-N perform Fourier transforms on the N digital signals $f(t) \times \exp(j\omega_n t)$ (n=1, . . . , N) after the frequency shift by performing the Fourier transform processes in parallel.

The signals $F_1(f)$ to $F_N(f)$ after the Fourier transforms which are acquired by the calculator 51 are the same as the signals $F_1(f)$ to $F_N(f)$ after the Fourier transforms which are acquired by the Fourier transform processing units 25-1 to 25-N.

The calculator 51 outputs the signals $F_1(f)$ to $F_N(f)$ after the Fourier transforms to the data storage unit 52.

The data storage unit 52 stores the signals $F_1(f)$ to $F_N(f)$ after the Fourier transforms which are outputted from the calculator 51.

The distance calculation unit 26 acquires the N signals $F_1(f)$ to $F_N(f)$ after the Fourier transforms from the data storage unit 52.

The distance calculation unit 26 calculates the distance L from the distance measurement device 2 to a distance measurement target from the N signals $F_1(f)$ to $F_N(f)$ after the Fourier transforms by using the method described in the Embodiment 1.

In the radar device shown in FIG. 8, the calculator 51 serially performs the frequency shifting process N times, and serially performs the Fourier transform process N times. However, this is only an example, and the calculator 51 may include the signal division unit 21 shown in FIG. 1, thereby performing the frequency shifting processes in parallel, like the frequency shift unit 22 shown in FIG. 1, and performing the Fourier transform processes in parallel, like the Fourier transform unit 24 shown in FIG. 1.

It is to be understood that an arbitrary combination of the above-mentioned is embodiments can be made, various changes can be made in an arbitrary component according to any one of the above-mentioned embodiments, or an arbitrary component according to any one of the above-mentioned embodiments can be omitted.

INDUSTRIAL APPLICABILITY

The present disclosure is suitable for a distance measurement device for and a distance measurement method of performing a distance measurement on a distance measurement target.

The present disclosure is suitable for a radar device including the distance measurement device.

REFERENCE SIGNS LIST

1: Optical transmission and reception unit (Optical transmitter and receiver), 2: Distance measurement device, 11: Frequency swept light source, 12: Optical branching unit, 13; Optical coupler, 14: Circulator, 15: Sensor head unit, 16: Condensing optical element, 17: Optical interferometer, 18: Optical detector. 19: A/D converter, 21: Signal division unit, 22: Frequency shift unit, 23-1 to 23-N: Frequency shift processing unit, 24: Fourier transform unit, 25-1 to 25-N: Fourier transform processing unit, 26: Distance calculation unit, 31: Signal division circuit, 32: Frequency shift circuit, 33: Fourier transform circuit. 34: Distance calculation circuit, 41: Memory, 42: Processor, 51: Calculator, 52: Data storage unit, 61: Calculation circuit, and 62: Data storage circuit.

What is claimed is:

1. A distance measurement device comprising:
   processing circuitry
   to divide a digital signal into N digital signals (N is an integer equal to or greater than 2), the digital signal showing interference light between reflected light which is received from a distance measurement target by applying part of frequency swept light whose frequency varies with time to the distance measurement target, and reference light which is the remaining part of the frequency swept light;

to shift a frequency of each of the N digital signals after distribution by a shift amount, the plurality of shift amounts of frequencies for the corresponding N digital signals being different from each other;

to perform a Fourier transform on each of the N digital signals after frequency shift; and to determine a frequency component related to the distance measurement target, out of a plurality of frequency components contained in all of N signals after the Fourier transform, to determine a shift amount from the plurality of shift amounts after the Fourier transform, the determined shift amount being related to a signal which includes the determined frequency component and is associated with one of the N digital signals, and to calculate a distance from the distance measurement device to the distance measurement target from a sum of a frequency of the determined frequency component and the determined shift amount.

2. The distance measurement device according to claim 1, wherein the processing circuitry includes N frequency shift processing circuits to respectively shift frequencies of the N digital signals after the distribution, and each of the N frequency shift processing circuits shifts a frequency of a digital signal different from those by other frequency shift processing circuits by a shift amount different from those of the other frequency shift processing circuits.

3. The distance measurement device according to claim 2, wherein the processing circuitry includes N Fourier transform processing circuits to respectively perform Fourier transforms on the N digital signals after the frequency shift by the N frequency shift processing circuits.

4. The distance measurement device according to claim 3, wherein the processing circuitry:

to determine the frequency component related to the distance measurement target, out of a plurality of frequency components contained in all of signals after Fourier transforms by the N Fourier transform processing circuits;

to determine the shift amount related to the signal after the Fourier transform which includes the determined frequency component, out of the plurality of shift amounts which are used for the shift of the frequency; and to calculate the distance from the distance measurement device to the distance measurement target from the sum of the frequency of the determined frequency component, and the determined shift amount.

5. The distance measurement device according to claim 1, wherein the distance measurement device includes a calculator, and the calculator shifts N times a frequency of the digital signal showing the interference light by shift amounts that are different from each other, and performs a Fourier transform on each of digital signals after the frequency shift.

6. A distance measurement method comprising:

dividing a digital signal into N digital signals (N is an integer equal to or greater than 2), the digital signal showing interference light between reflected light which is received from a distance measurement target by applying part of frequency swept light whose frequency varies with time to the distance measurement target, and reference light which is the remaining part of the frequency swept light;

shifting a frequency of each of the N digital signals after distribution by a shift amount, the plurality of shift amounts of frequencies for the corresponding N digital signals being different from each other;

performing a Fourier transform on each of the N digital signals after frequency shift; and determining a frequency component related to the distance measurement target, out of a plurality of frequency components contained in all of N signals after the Fourier transform, determining a shift amount from the plurality of shift amounts after the Fourier transform, the determined shift amount being related to a signal which includes the determined frequency component and is associated with one of the N digital signals, and calculating a distance from the distance measurement device to the distance measurement target from a sum of a frequency of the determined frequency component and the determined shift amount.

7. A radar device comprising:

the distance measurement device according to claim 1; and an optical transmitter and receiver to apply the part of the frequency swept light whose frequency varies with time to the distance measurement target, and to, after that, receive the reflected light which is frequency swept light reflected by the distance measurement target and to output the digital signal showing the interference light between the reflected light and reference light which is the remaining part of the frequency swept light to the distance measurement device.

8. A radar device comprising:

the distance measurement device according to claim 2; and an optical transmitter and receiver to apply the part of the frequency swept light whose frequency varies with time to the distance measurement target, and to, after that, receive the reflected light which is frequency swept light reflected by the distance measurement target and to output the digital signal showing the interference light between the reflected light and reference light which is the remaining part of the frequency swept light to the distance measurement device.

9. A radar device comprising:

the distance measurement device according to claim 3; and an optical transmitter and receiver to apply the part of the frequency swept light whose frequency varies with time to the distance measurement target, and to, after that, receive the reflected light which is frequency swept light reflected by the distance measurement target and to output the digital signal showing the interference light between the reflected light and reference light which is the remaining part of the frequency swept light to the distance measurement device.

10. A radar device comprising:

the distance measurement device according to claim 4; and an optical transmitter and receiver to apply the part of the frequency swept light whose frequency varies with time to the distance measurement target, and to, after that, receive the reflected light which is frequency swept light reflected by the distance measurement target and to output the digital signal showing the interference light between the reflected light and reference light which is the remaining part of the frequency swept light to the distance measurement device.

11. A radar device comprising:

the distance measurement device according to claim 5; and an optical transmitter and receiver to apply the part of the frequency swept light whose frequency varies with time to the distance measurement target, and to, after that, receive the reflected light which is frequency swept light reflected by the distance measurement target and to output the digital signal showing the interference light between the reflected light and reference light which is the remaining part of the frequency swept light to the distance measurement device.

\* \* \* \* \*